United States Patent
Kirchmair et al.

(10) Patent No.: US 10,059,391 B2
(45) Date of Patent: Aug. 28, 2018

(54) CRAWLER VEHICLE SUPPORTING DEVICE AND CRAWLER VEHICLE COMPRISING SUCH A SUPPORTING DEVICE

(71) Applicant: PRINOTH S.p.A., Vipiteno (BZ) (IT)

(72) Inventors: Martin Kirchmair, Pfons (AT); Gregor Maurer, Luxembourg (LU); Martin Runggaldier, St. Christina (IT)

(73) Assignee: PRINOTH S.P.A., Vipiteno (IT)

( * ) Notice: Subject to any disclaimer, the term of this patent is extended or adjusted under 35 U.S.C. 154(b) by 67 days.

(21) Appl. No.: 15/106,143

(22) PCT Filed: Dec. 19, 2014

(86) PCT No.: PCT/IB2014/067171
§ 371 (c)(1),
(2) Date: Jun. 17, 2016

(87) PCT Pub. No.: WO2015/092767
PCT Pub. Date: Jun. 25, 2015

(65) Prior Publication Data
US 2016/0362150 A1  Dec. 15, 2016

(30) Foreign Application Priority Data

Dec. 20, 2013 (IT) .............................. MI2013A2179

(51) Int. Cl.
*B62D 55/24* (2006.01)
*B62D 55/104* (2006.01)
(Continued)

(52) U.S. Cl.
CPC ............ *B62D 55/24* (2013.01); *B62D 55/10* (2013.01); *B62D 55/104* (2013.01);
(Continued)

(58) Field of Classification Search
CPC ........ B62D 55/10; B62D 55/12; B62D 55/14; B62D 55/24; B62D 55/26; B62D 55/104; B62D 55/108; E01H 4/02
(Continued)

(56) References Cited

U.S. PATENT DOCUMENTS 1,267,825 A * 5/1918 Trigwell .............. B62D 55/253
                                                              305/130
1,438,228 A   12/1922 Lawrence
(Continued)

FOREIGN PATENT DOCUMENTS

CA        908697       8/1972
CA       2455074       7/2005
(Continued)

OTHER PUBLICATIONS

Notification of the Recording of a Change Form PCT/IB/306 for International Application No. PCT/IB2014/067171.
(Continued)

*Primary Examiner* — Joseph M Rocca
*Assistant Examiner* — Felicia L. Brittman
(74) *Attorney, Agent, or Firm* — Neal, Gerber & Eisenberg LLP

(57) ABSTRACT

A supporting device for a crawler vehicle configured to groom ski slopes, is mounted between a rear wheel and a front wheel, resting along the inside of a traction portion of the track, and has a plurality of rollers much smaller in diameter than the rear wheel; a belt looped around the rollers; and a structure configured to support the rollers and to push the rollers and the belt against the inside of the traction portion of the track.

42 Claims, 5 Drawing Sheets

(51) Int. Cl.
  *B62D 55/108* (2006.01)
  *B62D 55/112* (2006.01)
  *B62D 55/12* (2006.01)
  *B62D 55/14* (2006.01)
  *B62D 55/26* (2006.01)
  *B62D 55/10* (2006.01)
  *E01H 4/02* (2006.01)

(52) U.S. Cl.
  CPC .......... *B62D 55/108* (2013.01); *B62D 55/112* (2013.01); *B62D 55/12* (2013.01); *B62D 55/14* (2013.01); *B62D 55/26* (2013.01); *E01H 4/02* (2013.01)

(58) Field of Classification Search
  USPC ....................................................... 180/9.62
  See application file for complete search history.

(56) References Cited

U.S. PATENT DOCUMENTS

| | | |
|---|---|---|
| 7,036,894 B1 | 5/2006 | Woodall |
| 7,086,490 B2 * | 8/2006 | Haringer .............. B62D 55/125 180/6.44 |
| 2013/0154345 A1 * | 6/2013 | Schulz ................... B62D 55/14 305/129 |
| 2014/0239709 A1 * | 8/2014 | Delisle ................... B62D 55/24 305/159 |

FOREIGN PATENT DOCUMENTS

| | | |
|---|---|---|
| EP | 1995159 | 11/2008 |
| EP | 2079628 | 7/2009 |

OTHER PUBLICATIONS

Notification Concerning Submission, Obtention or Transmittal of Priority Document for International Application No. PCT/IB2014/067171 dated Apr. 9, 2015.

International Search Report and Written Opinion for International Application No. PCT/IB2014/067171 dated May 28, 2015.

* cited by examiner

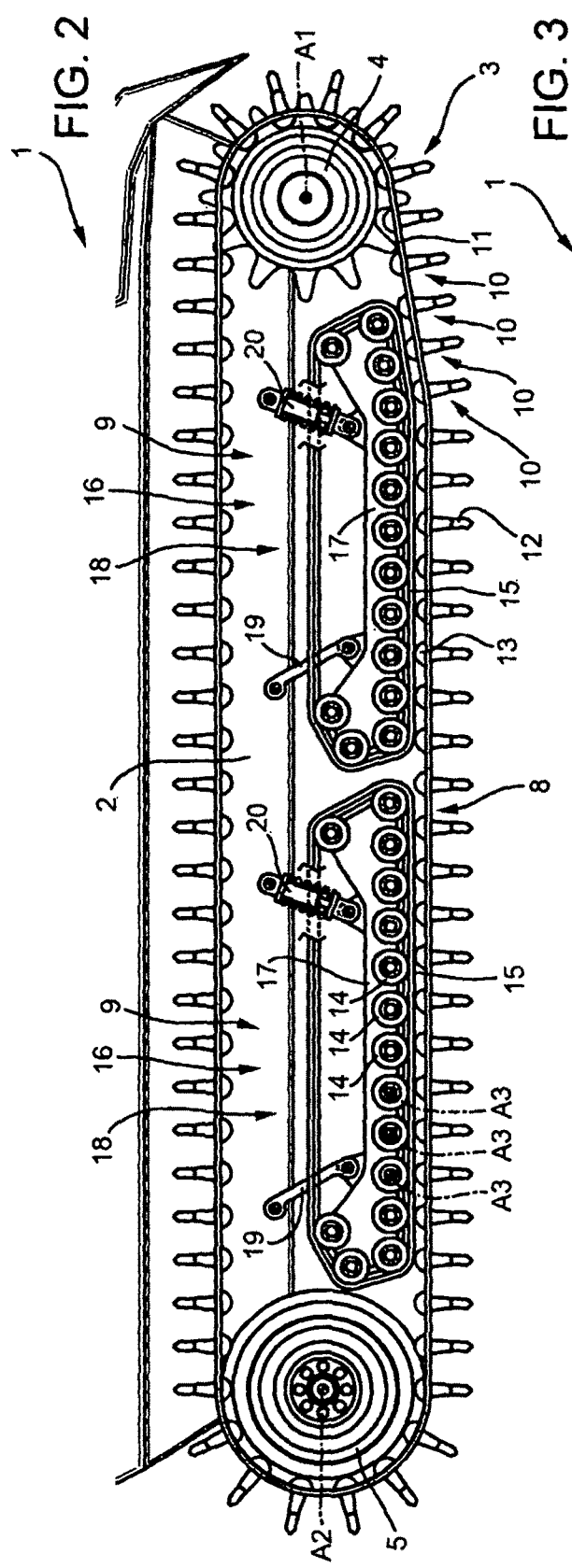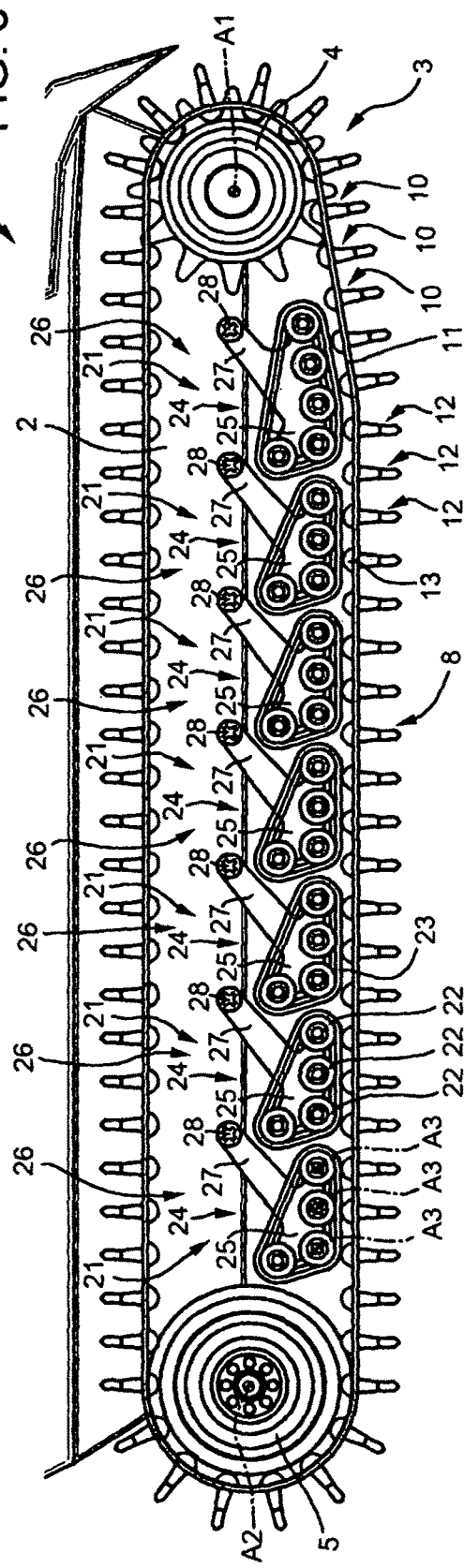

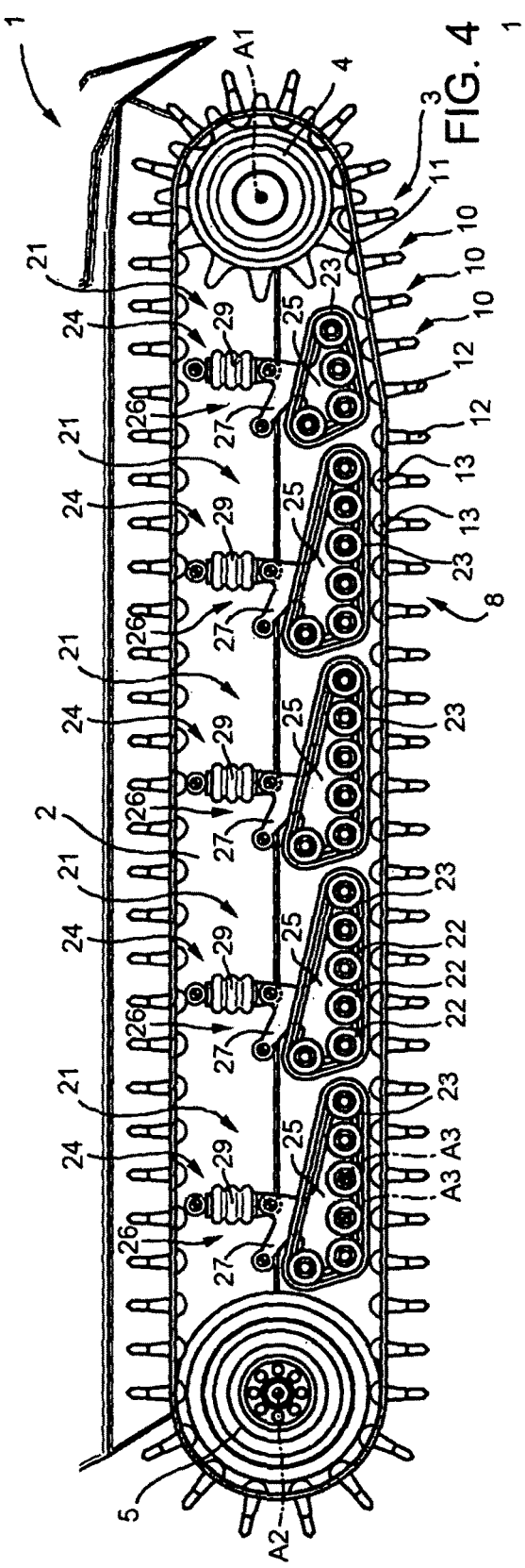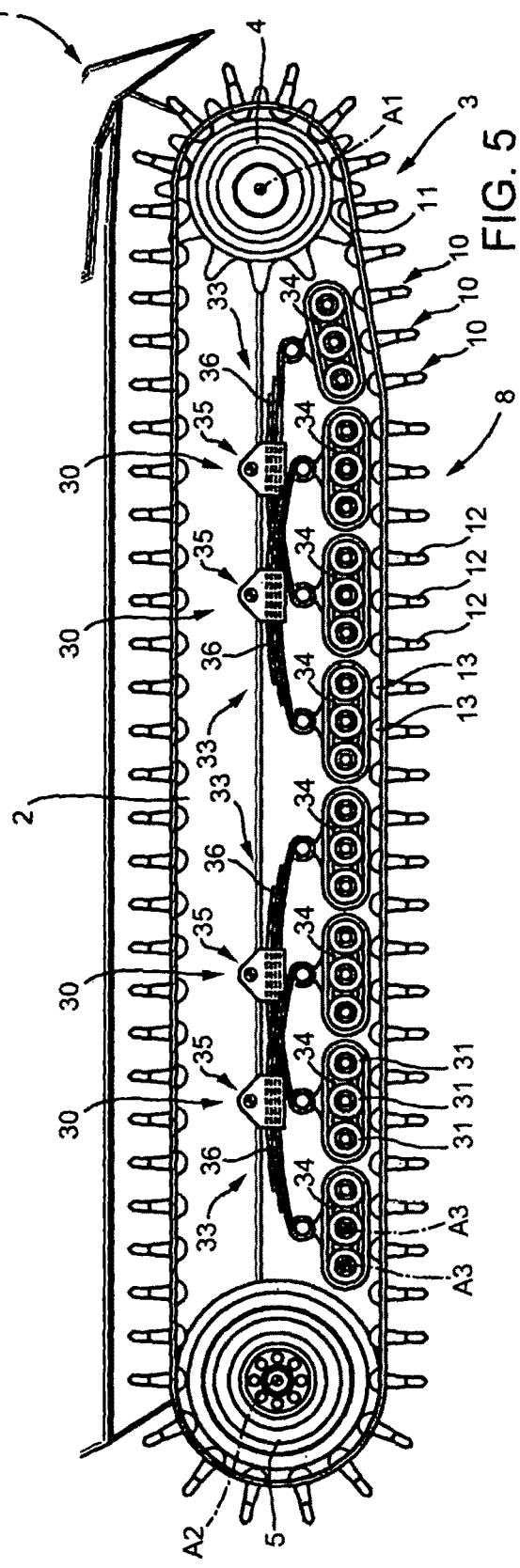

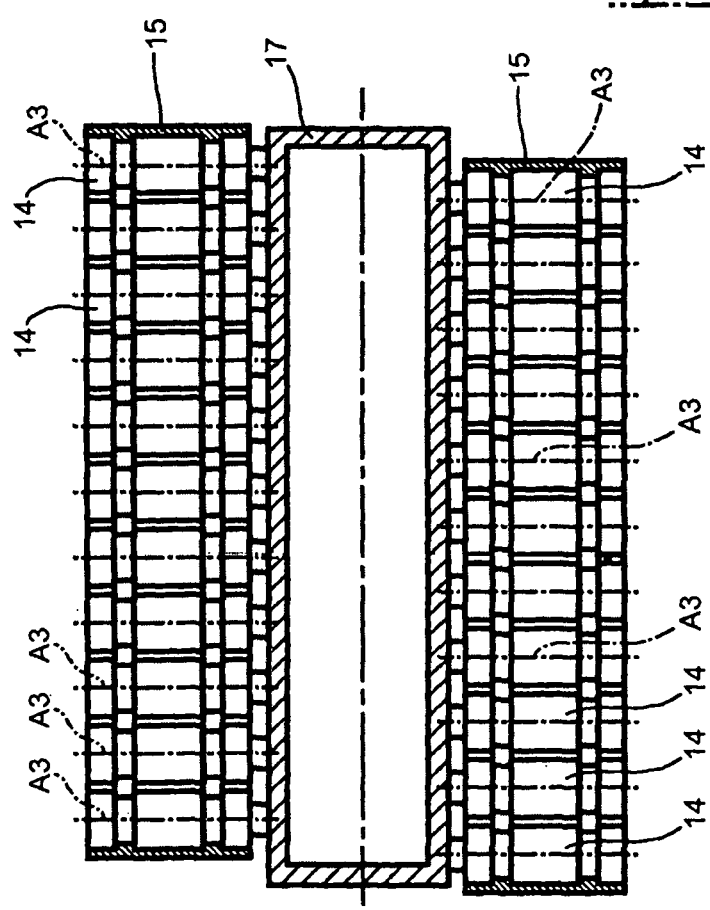
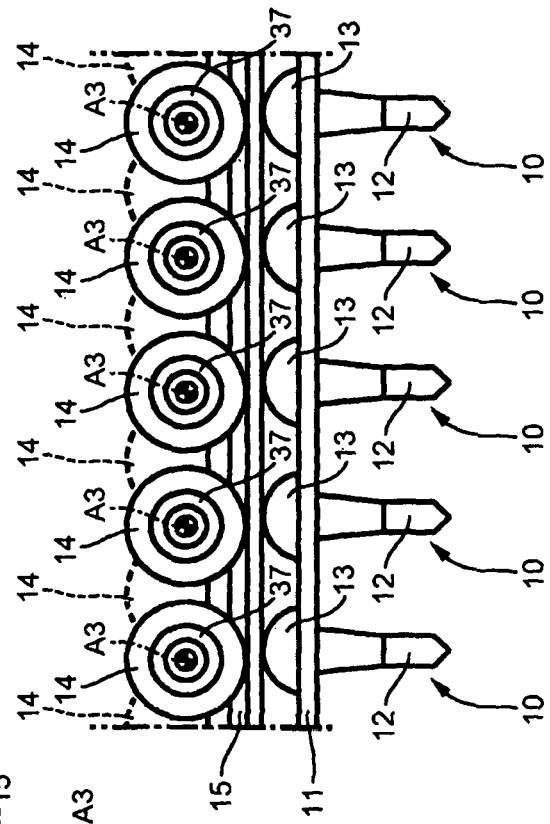

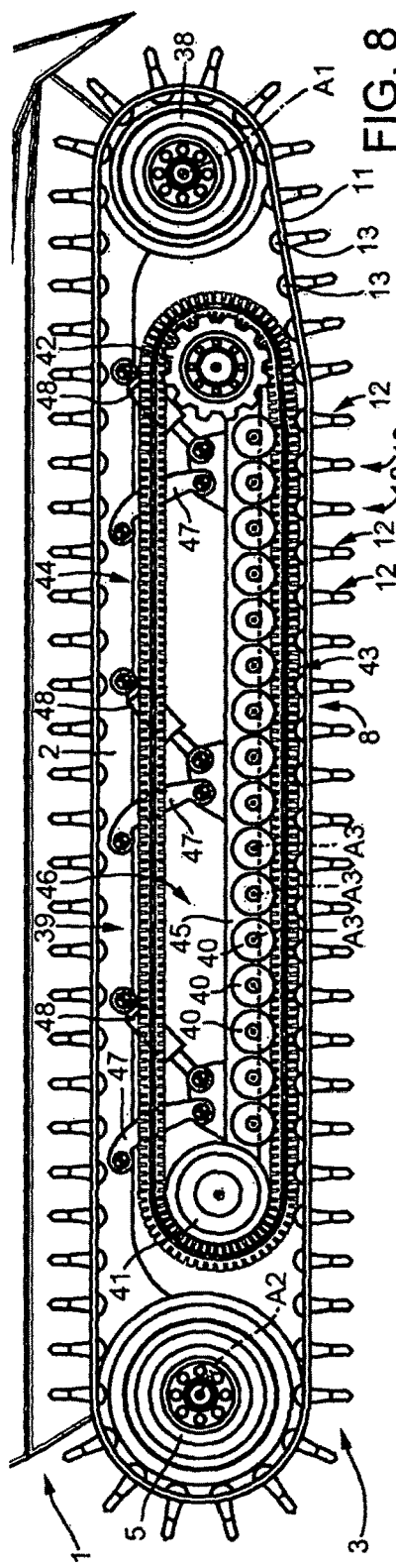
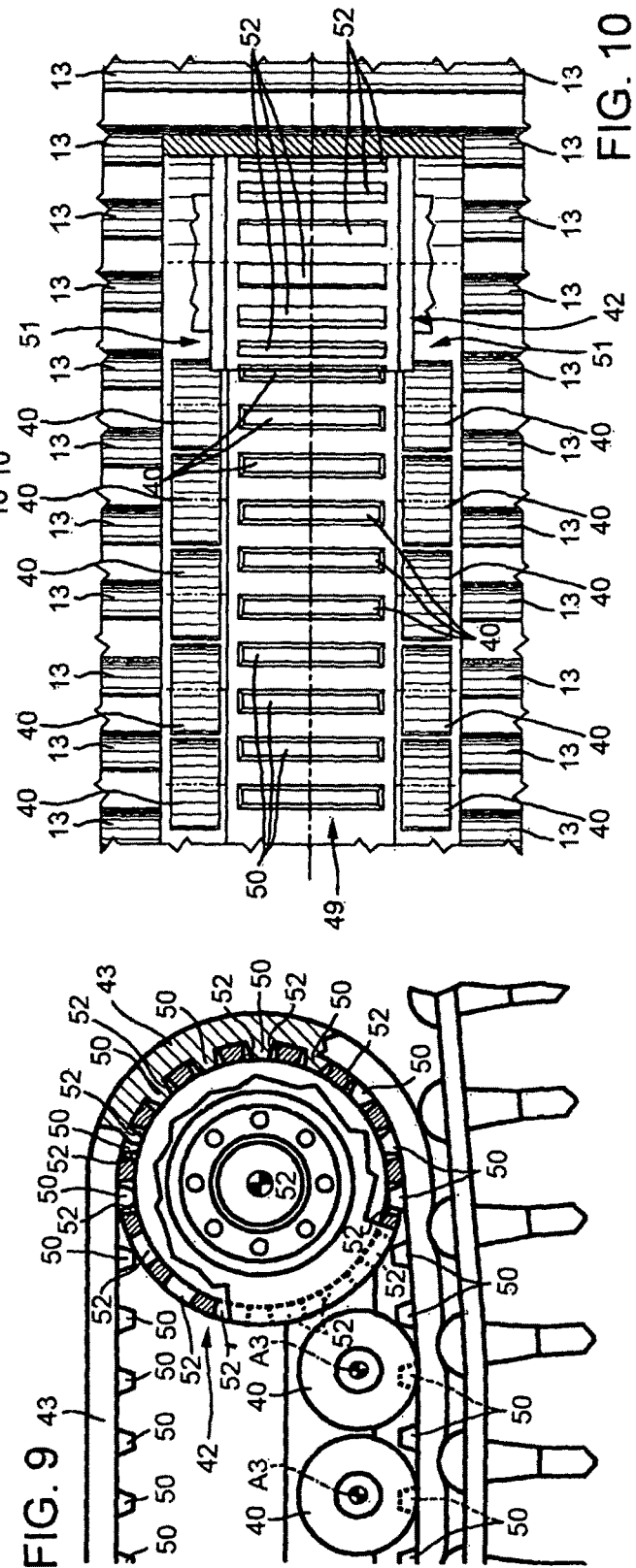
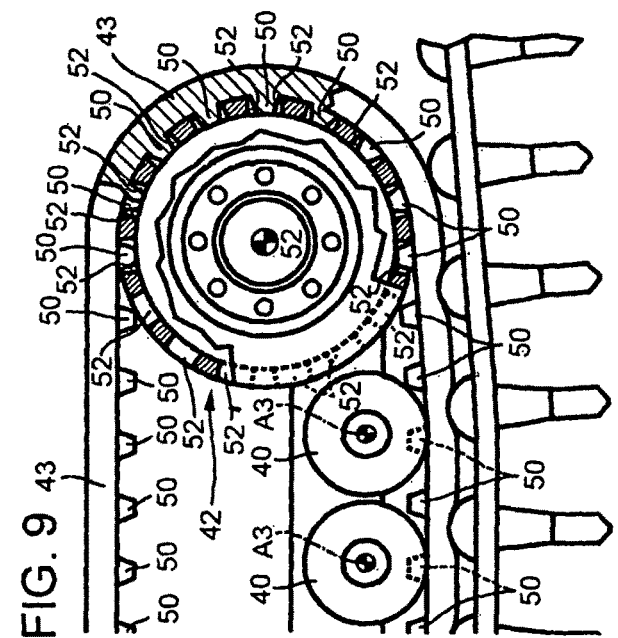

CRAWLER VEHICLE SUPPORTING DEVICE AND CRAWLER VEHICLE COMPRISING SUCH A SUPPORTING DEVICE

PRIORITY CLAIM

This application is a national stage application of PCT/IB2014/067171, filed on Dec. 19, 2014, which claims the benefit of and priority to Italian Patent Application No. MI2013A002179, filed on Dec. 20, 2013, the entire contents of which are each incorporated by reference herein.

BACKGROUND

In general, a track of a crawler vehicle configured to groom ski slopes comprises a plurality of evenly spaced transversal bars and belts made of an elastomeric material upon which the bars are fastened. Sometimes, the track also comprises a chain connected to the bars. The track is looped around a rear wheel and a front wheel. The rear wheel is usually a drive wheel and, for this reason, has lobes that engage the spaces between the bars, or between the links of the chain, if present. The lower portion of the track in contact with the ground is the so-called traction portion of the track. Crawler vehicles are generally provided with supporting wheels that are located between the rear wheel and the front wheel and have the functions of keeping the traction portion in contact with the ground and distributing the mass of the crawler vehicle along the traction portion.

In view of the diameter of the supporting wheels being particularly relatively large, the traction portion of the track does not remain perfectly straight, but tends to form humps between adjacent supporting wheels to the detriment of uniform distribution of the mass, performance and comfort. In fact, the undulated profile of the track generates vibrations that impair comfort and accelerate wear on the track.

To overcome certain of these drawbacks, in EP Patent No. 2,079,628 it was proposed to replace the supporting wheels with supporting devices, which comprise straight rails that are pressed against traction portion of the track and are slidingly housed in a chain guide. This solution necessitates providing guides that are configured to house the rails and mounted on the tracks and relatively small rollers mounted on the guides to reduce friction. It follows that the supporting devices described in EP Patent No. 2,079,628 complicate manufacturing the tracks and significantly increase friction and, in consequence, energy dissipation by friction.

SUMMARY

The present disclosure relates to a supporting device for a crawler vehicle, in particular for a crawler vehicle configured to groom ski slopes.

The advantage of the present disclosure is to provide a supporting device of the above-identified type that reduces or eliminates certain of the drawbacks of certain of the known art.

According to the disclosure, a supporting device is provided for a crawler vehicle, in particular for a crawler vehicle configured to groom ski slopes, the supporting device being located between a rear wheel and a front wheel along the inside of a traction portion of the track, and comprising a plurality of rollers much smaller in diameter than the rear wheel; a belt looped around the rollers, and a structure configured to support the rollers and to push the rollers and the belt against the inside of the traction portion of the track.

Through the present disclosure, it is possible to distribute the mass of the crawler vehicle in a relatively uniform manner along the traction portion of the track and, at the same time, generate relatively low friction between the supporting device and the track.

In certain embodiments, the rollers are arranged in a line and each have an axis of rotation parallel to the axis of rotation of the rear wheel.

It should be appreciated that the spacing pitch of the rollers is linked to the diameter of the rollers and the smaller the diameter of the rollers is, the more uniform is the distribution of the mass of the crawler vehicle.

Advantageously, the rollers are mounted on the structure. In certain embodiments, each roller is fitted to the structure in an elastically yielding manner to enable the roller to move in directions perpendicular to its axis of rotation. This type of installation enables damping shocks and compensating possible ground irregularities.

In accordance with one embodiment of the disclosure, the rollers are arranged side by side along a plurality of parallel lines. This configuration enables reducing stress on the track.

Advantageously, the supporting device comprises a plurality of belts, each belt being looped around a respective line of rollers.

Advantageously, the rollers of one line have respective axes of rotation offset with respect to the axes of rotation of the rollers of the adjacent line. In this way, for all intent and purposes, it is possible to reduce the spacing pitch of the rollers without reducing the diameter.

The belt is advantageously made of an elastomeric material. In this way, it is possible to reduce shocks and dampen any vibrations.

Advantageously, the belt has slits along at least one of the faces of the belt to increase the belt's deformability. This configuration enables making the surface layers of the roller particularly malleable.

From the constructional viewpoint, the structure comprises at least one beam configured to support the rollers and an articulated mechanism configured to connect the beam to a frame of the crawler vehicle. In this way, it is possible to control the distance between the rollers and the frame of the crawler vehicle.

In accordance with an alternative embodiment of the present disclosure, the belt is configured to be driven by a drive member and to transmit drive to the track.

In practice, it is possible to achieve crawler vehicle motion via the supporting device.

Advantageously, the supporting device comprises at least one drive wheel about which the belt is partially looped.

The drive wheel is advantageously driven by a hydraulic or electric actuator.

In accordance with one embodiment, the belt has ribs equally spaced along the inner face of the belt and the drive wheel comprises openings equally spaced about the axis of rotation of the drive wheel with the same spacing as the ribs; each opening being configured to house a rib. In this way, slippage between the drive wheel and the belt is avoided.

Advantageously, the belt has, along its inner face, a centre strip along which the ribs are spaced and two smooth lateral strips on which the rollers rest.

Through the present disclosure, it is possible to reconcile secure grip of the drive wheel with a track support that minimizes shocks.

A further advantage of the present disclosure is to provide a crawler vehicle that that reduces or eliminates certain of the drawbacks of certain of the known art.

In accordance with the present disclosure, a crawler vehicle is provided, in particular for grooming ski slopes, the crawler vehicle comprising:

a frame;
two rear wheels supported by the frame;
two front wheels supported by the frame;
two tracks, each looped around a respective rear wheel and front wheel and comprising a traction portion; and
at least two supporting devices, each as claimed in any one of the preceding claims and configured to be mounted on the inside of a respective track between a respective rear wheel and a respective front wheel.

Additional features and advantages are described in, and will be apparent from the following Detailed Description and the figures.

BRIEF DESCRIPTION OF THE DRAWINGS

Other characteristics and advantages of the present disclosure will become clear from the description that follows and its non-limitative examples of embodiment, with reference to the accompanying figures, where:

FIGS. 2, 3, 4 and 5 are side elevation views, with parts removed for clarity, of alternative embodiments of the supporting device in FIG. 1;

FIG. 6 is a plan view, with parts removed for clarity, of a further embodiment of the present disclosure;

FIG. 7 is a side elevation view, with parts removed for clarity and on an enlarged scale, of a detail in FIG. 2;

FIG. 8 is a side elevation view, with parts removed for clarity, of an alternative embodiment of the supporting device in FIG. 1.

FIG. 9 is a side elevation view, on an enlarged scale with parts removed for clarity and parts in section, of a variant of the embodiment in FIG. 8; and FIG. 10 is a plan view, with parts removed for clarity and parts in section, of the variant shown in FIG. 9.

DETAILED DESCRIPTION

Figure 1:
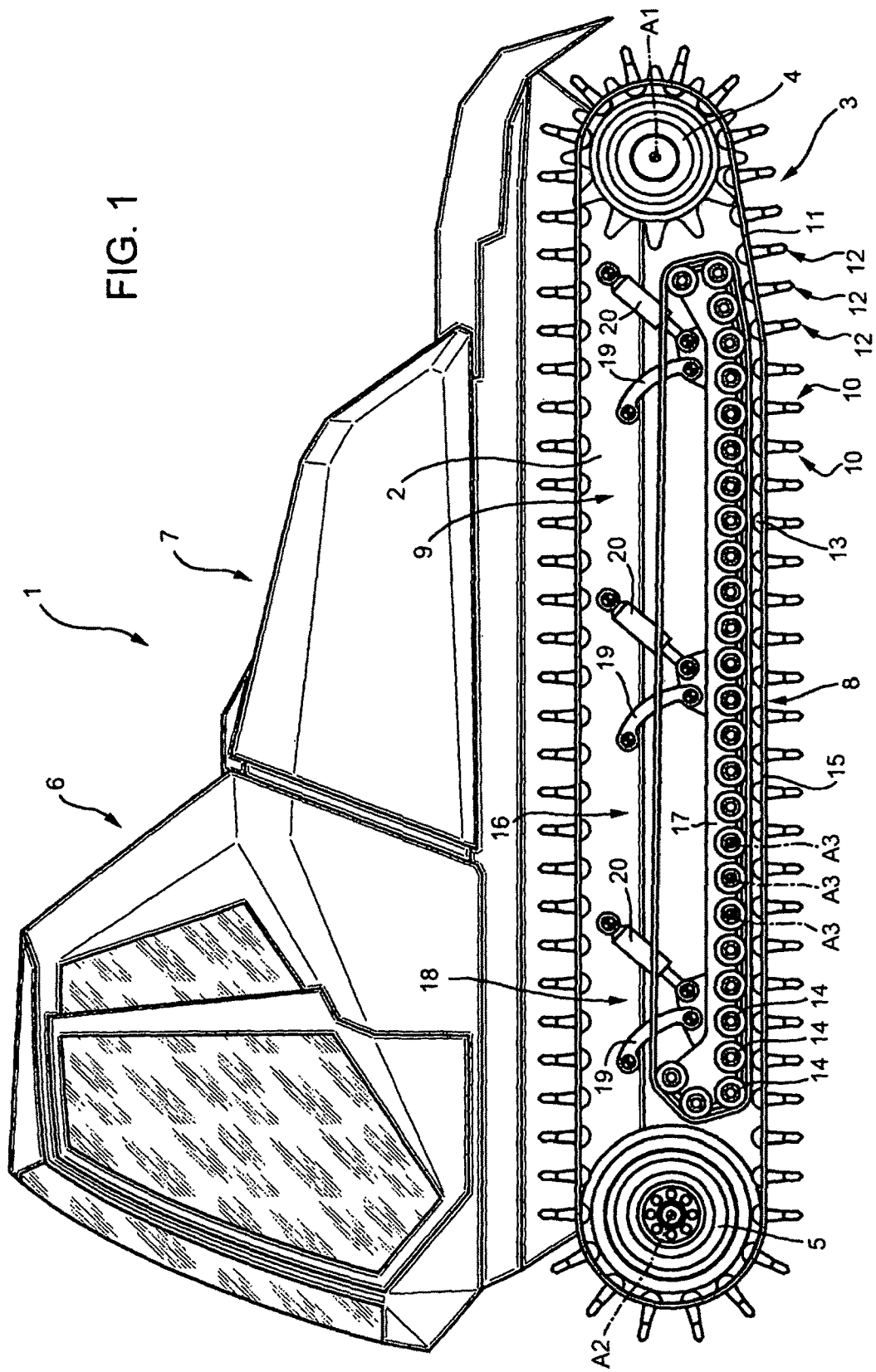
FIG. 1 is a side elevation view, with parts removed for clarity, of a crawler vehicle used for grooming ski slopes and equipped with a supporting device of the above-identified type.

Referring now to the example embodiments of the present disclosure illustrated in FIGS. 1 to 10, with reference to FIG. 1, reference numeral 1 indicates, as a whole. a crawler vehicle configured to groom ski slopes. The crawler vehicle 1 comprises a frame 2; two tracks 3 (only one shown in FIG. 1); two rear wheels 4 (only one shown in FIG. 1); two front wheels 5 (only one of which is shown in FIG. 1); a cabin 6; and an engine 7. The rear wheels 4 are drive wheels operated independently of each other by actuators, such as hydraulic or electric actuators, and are respectively coupled to the respective tracks 3.

Each track 3 is looped around a rear wheel 4 turning about axis of rotation A1 and a front wheel 5 turning about axis of rotation A2, and comprises an upper section and a lower section along which a traction portion 8 extends. In use, the traction portion is in contact with the ground to discharge to the ground the mass of the crawler vehicle 1 and the tractive force, transmitted by the engine 7 through a kinematic chain to the rear wheels 5.

The crawler vehicle 1 comprises two supporting devices 9 (only one of which is shown in FIG. 1), each of which is arranged within the loop of a respective track 3 between a rear wheel 4 and the respective front wheel 5 to distribute the mass of the crawler vehicle 1 along the traction portion 8 of the track 3 and press the traction portion 8 of the track 3 against the ground.

Each track 3 comprises a plurality of transverse elements 10 and closed-loop belts 11 made of an elastomeric material on which the transverse elements 10 are fastened. Each transverse element 10 comprises a crampon 12 and a bar 13 that are arranged on opposite sides of the belts 11 and are joined to grip the belts 11 between them.

The supporting device 9 comprises a plurality of rollers 14 much smaller in diameter than the rear wheel 5; a belt 15 looped around the rollers 14, and a structure 16 configured to support the rollers 14 and to push the rollers 14 and the belt 15 against the inside of the track 3 and along the traction portion 8 of the track 3.

The rollers 14 are arranged in a line and each have an axis of rotation A3 parallel to the axis of rotation A1 of the rear wheel 4.

Each wheel 14 is mounted on the structure 16. In accordance with one variant, each wheel 14 is mounted on the structure 16 in an elastically yielding manner to enable the wheel 14 to move in directions perpendicular to its axis of rotation A3.

Some rollers 14 are not aligned with the other rollers 14 in a straight line and mainly perform a guide function for the belt 15.

The belt 15 is made of an elastomeric material and is arranged directly in contact with the transverse elements 10, in particular, with the bars 13.

The structure 16 comprises at least one beam 17 configured to support the rollers 14 and an articulated mechanism 18 configured to connect the beam 17 to the frame 2 of the crawler vehicle 1.

The articulated mechanism 18 comprises an articulated quadrilateral formed by the beam 17, the frame 2 and by at least two arms 19, hinged to the beam 17 and the frame 2.

The structure 16 comprises at least one actuator 20 to adjust the position of the rollers 14 with respect to the frame 2. In particular, the actuator 20 is of the hydraulic type and hinged to the beam 17 and the frame 2.

In use, the supporting device 9 distributes part of the mass of the crawler vehicle 1 along the entire traction portion 8 of the track 3 and is able to reduce shocks by the actuator 20, while it can be arranged in different operating positions, always with respect to the frame 2, by the articulated mechanism 18. Adjustment of the distance between the rollers 14 and the frame 2 enables varying the length of the traction portion 8. In this case, the tension of the track 3 is adjusted by displacement of the front wheel 5 in the forward direction or in the opposite direction.

With reference to the embodiment in FIG. 2, each track 3 cooperates with two supporting devices 9 arranged in succession between the front wheel 5 and the rear wheel 4. This technical solution enables the crawler vehicle 1 to have relatively greater adjustment and damping versatility with respect to the embodiment in FIG. 1.

In the embodiment in FIG. 3, each track 3 cooperates with seven supporting devices 21 arranged in succession between the front wheel 5 and the rear wheel 4. Each supporting device 21, like supporting device 9, comprises a plurality of rollers 22 much smaller in diameter than the rear wheel 4; a belt 23 looped around the rollers 22; and a structure 24 configured to support the rollers 22 and to push the rollers 22 and the belt 23 against the inside of the track 3 and along the traction portion 8 of the track 3.

The rollers 22 are arranged in a line and each have an axis of rotation A3 parallel to the axis of rotation A1 of the rear wheel 4.

Each roller 22 is mounted on the structure 24, such as but not necessarily in an elastically yielding manner, to enable the roller 22 to move in directions perpendicular to its axis of rotation A3.

Some rollers 22 are not aligned with the other rollers 22 in a straight line and mainly perform a guide function for the belt 23.

The belt 23 is made of an elastomeric material and is arranged directly in contact with the transverse elements 10, in particular, with the bars 13.

The structure 24 comprises at least one beam 25 configured to support the rollers 22 and an articulated mechanism 26 configured to connect the beam 25 to the frame 2 of the crawler vehicle 1.

The articulated mechanism 26 comprises an arm 27, which is integral with the beam 25 and hinged to the frame 2.

The structure 16 comprises at least one rotating actuator 28 to adjust the angular position of the arm 27.

With reference to the embodiment in FIG. 4, reference numeral 21 indicates five supporting devices that, from the structural and functional viewpoint, are similar to those in FIG. 3. In the embodiment in FIG. 4, the rotating actuator 28 of FIG. 3 is replaced by a linear actuator 29, which is hinged to the frame 2 and to the arm 27 and also performs the damper function.

With reference to the embodiment in FIG. 5, reference numeral 30 indicates the supporting devices arranged between the front wheel 5 and the rear wheel 4.

Each supporting device 30 comprises two sets of rollers 31 much smaller in diameter than the rear wheel 4; two belts 32 respectively looped around the two sets of rollers 31; and a structure 33 configured to support the two sets of rollers 31 and to push the rollers 31 and the belt 32 against the inside of the track 3 and along the traction portion 8 of the track 3.

Each set has the rollers 31 arranged in a line. Each roller 31 can rotate about an axis of rotation A3 parallel to the axis of rotation A1 of the rear wheel 4.

Each roller 31 is mounted on the structure 33, such as but not necessarily in an elastically yielding manner, to enable the roller 31 to move in directions perpendicular to its axis of rotation A3.

The belt 32 is made of an elastomeric material and is arranged in direct contact with the transverse elements 10, in particular, with the bars 13.

The structure 33 comprises two beams 34 to support the rollers 31 and an articulated mechanism 35 to connect the beam 34 to the frame 2 of the crawler vehicle 1.

The articulated mechanism 35 comprises a leaf spring 36, which is hinged to the beams 34 at the ends and to the frame 2 at the central part of the leaf spring 36.

In practice, the two sets of rollers 31 of each supporting device 30 are supported by a rocker-arm structure.

In the configuration shown in FIG. 5, two supporting devices 30 overlap to arrange the sets of rollers 31 in an alternating manner.

FIG. 6 regards a variant of the supporting device in FIG. 2. According to this variant, the supporting device 9 comprises two lines of rollers 14 arranged on opposite sides of the beam 17 and two belts 15 looped around the rollers 14 of the respective lines.

In particular, the axes of rotation A3 of the rollers 14 of each line are spaced with the same pitch and the axes of rotation A3 of the rollers 14 of one line are offset by half the pitch with respect to the axes of rotation A3 of the rollers 14 of the other line.

FIG. 7 shows the type of support defined by the supporting device 9 together with the structure of the crawler vehicle 1.

In practice, the belt 15 is gripped between the transverse elements 10 and the rollers 14. The rollers 14 can be mounted elastically on the beam 17 or can comprise an elastically yielding annular element 37.

With reference to the embodiment in FIG. 8, the groomer vehicle 1 comprises two idler rear wheels 38 (only one shown in FIG. 8) which replace rear wheels 4.

Each track 3 is looped around a rear wheel 38 turning about axis of rotation A1 and a front wheel 5 turning about axis of rotation A2, and comprises an upper section and a lower section along which a traction portion 8 extends, which, in use, is in contact with the ground to discharge the mass of the crawler vehicle 1 and the tractive force to the ground.

The crawler vehicle 1 comprises two supporting devices 39 (only one of which is shown in FIG. 8), each of which is arranged within the loop of a respective track 3 between a rear wheel 38 and the respective front wheel 5 to distribute the mass of the crawler vehicle 1 along the traction portion 8 of the track 3 and press the traction portion 8 of the track 3 against the ground.

The supporting device 39 comprises a plurality of rollers 40 much smaller in diameter than the rear wheel 38, two wheels 41 and 42; a belt 43 looped around the rollers 40 and the wheels 41 and 42; and a structure 44 configured to support the rollers 40 and the wheels 41 and 42 and to push the rollers 40 and the belt 43 against the inside of the track 3 and along the traction portion 8 of the track 3.

The rollers 40 are arranged in a line and each have an axis of rotation A3 parallel to the axis of rotation A1 of the rear wheel 38.

Each roller 40 is mounted on the structure 44, such as but not necessarily in an elastically yielding manner, to enable the roller 40 to move in directions perpendicular to its axis of rotation A3.

Wheel 41 has the function of guiding the belt 43, while wheel 42 has the function of guiding the belt 43 and transmitting drive to the belt 43, which in turn transmits drive to the track 3. In other words, wheel 42 is a drive wheel. For this purpose, wheel 42 has lobes. In certain embodiments, the belt 43 is made with substantial thickness. In certain embodiments, slits are made on the opposite faces of the belt 43 to consequently increase superficial elastic deformability, which facilitates grip with both the wheel 42 and the track 3.

In accordance with one variant that is not shown. the slits are only provided along one face of the belt 43, The structure 44 comprises at least one beam 45 configured to support the rollers 40 and an articulated mechanism 46 configured to connect the beam 45 to the frame 2 of the crawler vehicle 1.

The articulated mechanism 46 comprises an articulated quadrilateral formed by the beam 45, the frame 2 and by at least two arms 47, hinged to the beam 45 and the frame 2.

The structure 44 comprises at least one actuator 48 to adjust the position of the rollers 40 with respect to the frame 2. In certain embodiments, the actuator 48 is of the hydraulic type and hinged to the beam 45 and the frame 2.

With reference to the variant shown in FIGS. 9 and 10, the belt 43 has a smooth outer face and a toothed inner face. In the case in point, the inner face comprises a center strip 49, along which the projections 50 are equally spaced and which in the case shown are ribs parallel to the axis of rotation of the drive wheel 42; and two smooth lateral strips 51 (FIG. 10).

With reference to FIG. 10, the drive wheel 42 extends mainly at the center strip 49 and has a cage-like structure with openings or seats 52 equally spaced about axis A2 with the same spacing pitch as the projections 50. Each opening 52 is sized to house a projection 50. In other words, wheel 42 engages with the center strip 49.

Two lines of rollers 40 are arranged on opposite sides of the center strip. Each roller 40 is only in contact with one of the lateral strips 51.

The scope of the present disclosure is defined by the claims, which cover variants that are not explicitly described and equivalent embodiments. As such, changes may be made to the embodiments of the present disclosure described with reference to the attached drawings without, however, departing from the protective scope of the accompanying Claims. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A crawler vehicle supporting device configured to be located along an inside of a traction portion of a track of a crawler vehicle and between a rear wheel of the crawler vehicle and a front wheel of the crawler vehicle, said crawler vehicle supporting device comprising:
   a plurality of rollers which are each smaller in diameter than the rear wheel of the crawler vehicle;
   a belt looped around the plurality of rollers; and
   a structure including at least one beam configured to support the plurality of rollers, and an articulated mechanism configured to connect the at least one beam to a frame of the crawler vehicle, the structure configured to push the plurality of rollers and the belt against the inside of the traction portion of the track of the crawler vehicle.

2. The crawler vehicle supporting device of claim 1, wherein the plurality of rollers are arranged in a line, and each has an axis of rotation parallel to an axis of rotation of the rear wheel of the crawler vehicle.

3. The crawler vehicle supporting device of claim 2, wherein the plurality of rollers are fitted to the structure.

4. The crawler vehicle supporting device of claim 3, wherein each roller is elastically fitted to the structure to enable the roller to move in a direction perpendicular to its axis of rotation.

5. The crawler vehicle supporting device of claim 1, wherein the plurality of rollers are arranged in a plurality of parallel lines.

6. The crawler vehicle supporting device of claim 5, which includes a plurality of belts, each belt being looped around a respective line of rollers.

7. The crawler vehicle supporting device of claim 5, wherein the respective axes of rotation of the rollers in one line are offset with respect to the axes of rotation of the rollers in an adjacent line.

8. The crawler vehicle supporting device of claim 1, wherein the belt is made of an elastomeric material.

9. The crawler vehicle supporting device of claim 1, wherein the belt defines a plurality of slits along at least one of its faces.

10. The crawler vehicle supporting device of claim 1, wherein the articulated mechanism includes an articulated quadrilateral.

11. The crawler vehicle supporting device of claim 1, wherein the articulated mechanism includes at least one actuator configured to adjust a position of the plurality of rollers with respect to the frame.

12. The crawler vehicle supporting device of claim 11, wherein the at least one actuator includes a hydraulic actuator.

13. The crawler vehicle supporting device of claim 1, wherein the belt is configured to be driven by a drive member and to transmit drive to the track of the crawler vehicle.

14. The crawler vehicle supporting device of claim 13, which includes a drive wheel about which the belt is partly looped.

15. The crawler vehicle supporting device of claim 14, wherein:
   the belt defines a plurality of projections equally spaced along an inner face of the belt, and
   the drive wheel defines a plurality of openings equally spaced about the axis of rotation of the drive wheel with a same spacing pitch as the plurality of projections, each opening being configured to house at least one of the projections.

16. The crawler vehicle supporting device of claim 15, wherein the belt includes, along the inner face of the belt, a center strip along which the plurality of projections are spaced and two smooth lateral strips on which the plurality of rollers rest.

17. The crawler vehicle supporting device of claim 1, wherein the crawler vehicle is configured to groom ski slopes.

18. A crawler vehicle comprising:
   a frame;
   a first rear wheel supported by the frame;
   a second rear wheel supported by the frame;
   a first front wheel supported by the frame;
   a second front wheel supported by the frame;
   a first track looped around the first rear wheel and the first front wheel, said first track defining a first traction portion;
   a second track looped around the second rear wheel and the second front wheel, said second track defining a second traction portion,
   a first supporting device configured to be mounted on an inside of the first track between the first rear wheel and the first front wheel, said first supporting device including:
      a first plurality of rollers which are each smaller in diameter than the first rear wheel;
      a first belt looped around the first plurality of rollers; and
      a first structure configured to:
         (i) support the first plurality of rollers, and
         (ii) push the first plurality of rollers and the first belt against an inside of the first traction portion of the first track;
   a second supporting device configured to be mounted on an inside of the second track between the second rear wheel and the second front wheel, said second supporting device including:
      a second plurality of rollers which are each smaller in diameter than the second rear wheel;
      a second belt looped around the second plurality of rollers; and a second structure configured to:
(i) support the second plurality of rollers, and
(ii) push the second plurality of rollers and the second belt against an inside of the second traction portion of the second track, and a third supporting device configured to be mounted on an inside of the first track between the first rear wheel and the first front wheel, said third supporting device including:
a third plurality of rollers which are each smaller in diameter than the first rear wheel;
a third belt looped around the third plurality of rollers; and
a third structure configured to:
(i) support the third plurality of rollers, and
(ii) push the third plurality of rollers and the third belt against an inside of the first traction portion of the first track.

19. The crawler vehicle of claim 18, which includes a fourth supporting device configured to be mounted on an inside of the second track between the second rear wheel and the second front wheel, said fourth supporting device including:
a fourth plurality of rollers which are each smaller in diameter than the second rear wheel;
a fourth belt looped around the fourth plurality of rollers; and
a fourth structure configured to:
(i) support the fourth plurality of rollers, and
(ii) push the fourth plurality of rollers and the fourth belt against an inside of the second traction portion of the second track.

20. The crawler vehicle of claim 18, which is configured to groom ski slopes.

21. A crawler vehicle supporting device configured to be located along an inside of a traction portion of a track of a crawler vehicle and between a rear wheel of the crawler vehicle and a front wheel of the crawler vehicle, said crawler vehicle supporting device comprising:
a plurality of rollers which are each smaller in diameter than the rear wheel of the crawler vehicle;
a belt looped around the plurality of rollers, the belt defining a plurality of slits along at least one of its faces; and
a structure configured to:
(i) support the plurality of rollers, and
(ii) push the plurality of rollers and the belt against the inside of the traction portion of the track of the crawler vehicle.

22. The crawler vehicle supporting device of claim 21, wherein the plurality of rollers are arranged in a line, and each has an axis of rotation parallel to an axis of rotation of the rear wheel of the crawler vehicle.

23. The crawler vehicle supporting device of claim 22, wherein the plurality of rollers are fitted to the structure.

24. The crawler vehicle supporting device of claim 23, wherein each roller is elastically fitted to the structure to enable the roller to move in a direction perpendicular to its axis of rotation.

25. The crawler vehicle supporting device of claim 21, wherein the plurality of rollers are arranged in a plurality of parallel lines.

26. The crawler vehicle supporting device of claim 25, which includes a plurality of belts, each belt being looped around a respective line of rollers.

27. The crawler vehicle supporting device of claim 25, wherein the respective axes of rotation of the rollers in one line are offset with respect to the axes of rotation of the rollers in an adjacent line.

28. The crawler vehicle supporting device of claim 21, wherein the belt is made of an elastomeric material.

29. The crawler vehicle supporting device of claim 21, wherein the crawler vehicle is configured to groom ski slopes.

30. A crawler vehicle supporting device configured to be located along an inside of a traction portion of a track of a crawler vehicle and between a rear wheel of the crawler vehicle and a front wheel of the crawler vehicle, said crawler vehicle supporting device comprising:
a plurality of rollers which are each smaller in diameter than the rear wheel of the crawler vehicle;
a belt looped around the plurality of rollers, wherein the belt is configured to be driven by a drive member and to transmit drive to the track of the crawler vehicle; and
a structure configured to:
(i) support the plurality of rollers, and
(ii) push the plurality of rollers and the belt against the inside of the traction portion of the track of the crawler vehicle.

31. The crawler vehicle supporting device of claim 30, wherein the plurality of rollers are arranged in a line, and each has an axis of rotation parallel to an axis of rotation of the rear wheel of the crawler vehicle.

32. The crawler vehicle supporting device of claim 31, wherein the plurality of rollers are fitted to the structure.

33. The crawler vehicle supporting device of claim 32, wherein each roller is elastically fitted to the structure to enable the roller to move in a direction perpendicular to its axis of rotation.

34. The crawler vehicle supporting device of claim 30, wherein the plurality of rollers are arranged in a plurality of parallel lines.

35. The crawler vehicle supporting device of claim 34, which includes a plurality of belts, each belt being looped around a respective line of rollers.

36. The crawler vehicle supporting device of claim 34, wherein the respective axes of rotation of the rollers in one line are offset with respect to the axes of rotation of the rollers in an adjacent line.

37. The crawler vehicle supporting device of claim 30, wherein the belt is made of an elastomeric material.

38. The crawler vehicle supporting device of claim 30, wherein the belt defines a plurality of slits along at least one of its faces.

39. The crawler vehicle supporting device of claim 30, which includes a drive wheel about which the belt is partly looped.

40. The crawler vehicle supporting device of claim 39, wherein:
the belt defines a plurality of projections equally spaced along an inner face of the belt, and
the drive wheel defines a plurality of openings equally spaced about the axis of rotation of the drive wheel with a same spacing pitch as the plurality of projections, each opening being configured to house at least one of the projections.

41. The crawler vehicle supporting device of claim 40, wherein the belt includes, along the inner face of the belt, a center strip along which the plurality of projections are spaced and two smooth lateral strips on which the plurality of rollers rest.

42. The crawler vehicle supporting device of claim 30, wherein the crawler vehicle is configured to groom ski slopes.

\* \* \* \* \*